June 7, 1927.
H. P. CHANDLER
CONNECTING DEVICE
Filed March 20, 1924
1,631,719
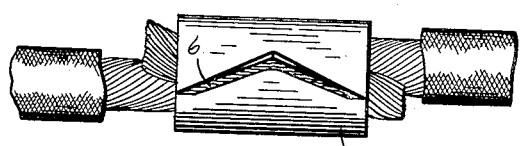
Fig. 1.
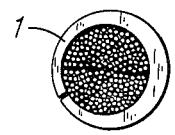
Fig. 2.
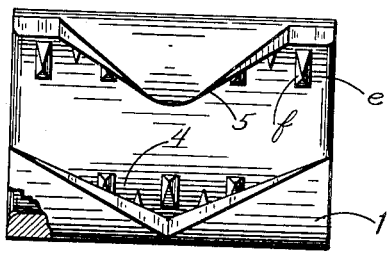
Fig. 3.
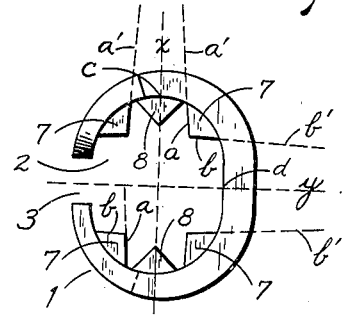
Fig. 4.
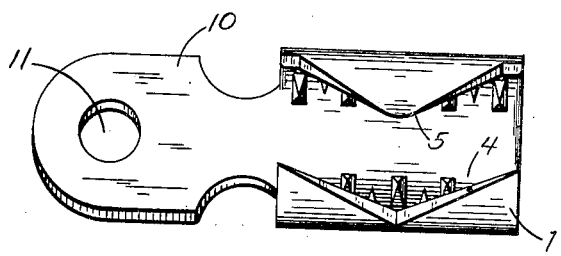
Fig. 6.
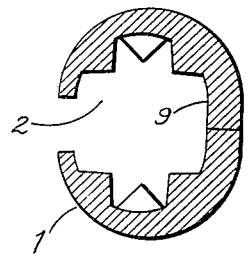
Fig. 5.
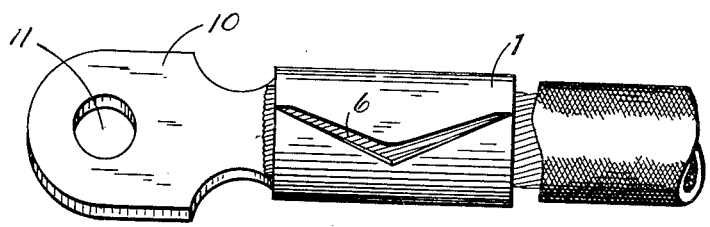
Fig. 7.   HOMER P. CHANDLER.
G. G. Allenbaugh
Inventor
By
Attorney

Patented June 7, 1927.

1,631,719

UNITED STATES PATENT OFFICE.

HOMER P. CHANDLER, OF MANSFIELD, OHIO, ASSIGNOR TO THE OHIO BRASS COMPANY, OF MANSFIELD, OHIO, A CORPORATION OF NEW JERSEY.

CONNECTING DEVICE.

Application filed March 20, 1924. Serial No. 700,517.

My invention relates to a connecting or fastening device and may be adapted for a variety of purposes, as for instance, the connecting of the ends of cables and the maintaining of a plurality of cables in contact with each other, or it may be used for fastening the ends of lath or belting by properly proportioning and shaping the various parts. I have shown its use as applied to connecting the ends of cables and also maintaining the ends of the cables in side contact with each other as would be the case if two parallel and continuous cables were held in contact.

My invention may be used as a permanent or temporary fastening or connecting device.

My invention resides in the new and novel construction, combination and relation of the various parts of which it is composed, as fully hereinafter described and shown in the drawings.

In the drawing accompanying this specification:

Fig. 1 shows a top plan view of my invention as applied to the connecting of the ends of two cables placed side by side.

Fig. 2 is an end view of Fig. 1.

Fig. 3 is a top plan view of my invention ready to receive the ends of the cables.

Fig. 4 is an end view of Fig. 3.

Fig. 5 is a sectional view taken on the line 5—5 of Fig. 3.

Fig. 6 is a modification of the invention shown in the other figures, in that it is adapted to connect a cable to a part of a machine or to a duplicate device attached to another cable. This provides means for connecting and disconnecting a cable readily from a piece of apparatus.

Fig. 7 shows the device disclosed in Fig. 6 as secured to a cable.

As shown, my invention comprises the slotted tubular sleeve member 1 having a channel 2 extending therethrough having an elliptical cross section. Extending longitudinally of the member 1 and along one side is a slot 3 extending through the sleeve member 1 into the channel 2. The adjacent case and edges of the slot 3 are formed with an oppositely disposed groove 4 and tongue 5. I have shown the groove 4 and the tongue 5 approaching a V-shaped formation although this particular shape is not essential. The oppositely disposed edges of the groove and tongue are shown as other than parallel when in a closed position upon the cable and the outer edge of the member forming the groove is arranged to contact with the opposite disposed edge of the sleeve member so as to prevent the sides of the tongue from engaging with the oppositely disposed sides of the groove thereby forming the space or opening 6 substantially throughout the longitudinal length of the connecter of the device when the device has been closed upon a cable. This space or opening is provided for the purpose of applying solder, if desired, along the interior of the device and into engagement with the cable or cables after the device has been applied to the cable or cables when it is desired to make a permanent joint. If the space or opening 6 was not provided, but a closed joint existed, it would be apparent that if it is desired to make a permanent joint by solder that it would be necessary to apply the solder to either or both ends and permit it to run from end to end. With my invention, however, it is possible to apply the solder throughout the longitudinal length by means of the space or opening 6, and the distance that the solder must flow is much less in my invention than where no space or slot exists thereby increasing the reliability of a proper permanent joint being made.

My invention may also be used for connecting what might be termed temporary joints, that is, where the cables are connected without solder. Although such temporary joints are found to be efficient, I provide as a precaution against the cables pulling out of the sleeve, the projections or teeth 7 and 8 and these teeth I prefer to be raised above the surface 9 of the sleeve member 1. It is evident that when the device has been clamped upon a stranded cable that these teeth will interengage with the individual wires of the cable, making it practically impossible to pull the cable out of the sleeve. As my invention may also be used on solid wire, as well as stranded cable, it will be apparent that it will be necessary to leave the teeth 7 and 8 off of the device when intended for use with solid wire.

The sleeve member 1 I prefer to make of varying thickness, as shown in the cross section in Fig. 5, and by properly proportioning the thickness with respect to the shape of the sleeve member 1 when in the open position, I find that it is possible to ultimately form the device about the cable so that it will grip the same uniformly throughout the circumference.

I also prefer to make my device of cast material which may be of bronze, brass, copper, malleableized cast iron, etc. I also find that in order to produce the teeth in a casing it is necessary for them to have a certain relation with respect to the sleeve portion, for the reason that the channel 2 is produced by means of a sand core and these teeth are formed in the sand core and it is necessary that they shall be of certain shape in order to produce the sand core. The teeth 7 are provided with the sides $a$ and $b$ and these faces have a certain relation to the lines $x$ and $y$, respectively, that is, if the sides $a$ are extended they would meet the line $x$ at a point beyond the point $c$ which is the intersection of the line $x$ with the inner surface 9 of the sleeve, as indicated by the dotted lines $a'$ which will meet the line $x$ at a distant point. As shown in Fig. 4, this point is quite a distance from the center of the device for the reason that the faces $a$ are close to parallel with the line $x$. The same is true of the faces $b$ which if extended, as indicated by the lines $b'$ across the line $y$ at a point beyond the point $d$ which is the intersection of the line $y$ with the inner surface 9 of the sleeve. The faces $a$ and $b$ form the apex of a pyramid and the opposite sides $e$ and $f$ of the teeth 7 form the other two sides of the pyramid. In place of a pyramid a cone shaped tooth could be used. The principle, however, as to the construction of its side, would apply as in the case of the pyramid shaped tooth just described. The lines $x$ and $y$ might be termed the long and short axes, respectively, of the sleeve 1.

The teeth 8 are shown as pyramids, although they also may be cones, the apex of which, however, points toward the intersection of the lines $x$ and $y$. The teeth 7 and 8 are preferably alternately disposed, so as to distribute their gripping effect quite uniformly over the entire inner surface of the device.

In the modification shown in Figs. 6 and 7, the portion for gripping the cable is the same as described above and, therefore, such corresponding parts have the same numerals applied thereto. The modification comprises the projecting tongue 10 applied to the device shown in Fig. 3 and this tongue is preferably of a rather thin and flat construction and is provided with an opening 11 to receive a bolt for securing the device to a piece of apparatus, or for securing two tongues 10 face to face, as when desired to connect the ends of two cables, using the device shown in Fig. 6 as against that shown in Fig. 3.

In applying my invention to a cable, as shown in Fig. 1, the ends are inserted in the channel 2 and then by means of a hammer the sleeve is closed upon the cables until the sleeve securely grips the ends of the cables or until the extreme outer portions of the sleeve forming the slot 3 meet, as shown in Fig. 1. By applying the proper sized sleeve to a cable, the condition shown in Fig. 1 will be met and the slot or opening 6 will be formed through which solder may be applied, as before stated, by first heating the parts slightly beyond the melting point of the solder and then applying the solder within the slot.

Having described my invention, I claim:

1. A fastening device to connect two cables with coinciding axes comprising a sleeve member of yieldable material having a longitudinally disposed channel therethrough and a V-shaped tongue and groove forming a longitudinal slot along one side and opening into said channel and adapted to be formed about the ends of the cables placed in said channel, the channel being of elliptical cross-section and spaced means on one edge of the adjacent edges of the sleeve member forming the slot adapted to engage with spaced means on the opposite edge of the slot when the sleeve is in the formed position to maintain the slot open between the said means, the transverse cross-section of the sleeve increasing in thickness from the edges of the slot toward the oppositely disposed point of the sleeve.

2. A fastening device comprising a formable sleeve member provided with a channel therethrough to receive and grip the ends of two cables having coinciding axes, a slot along one side of said sleeve, means at the extreme ends of said slot to prevent the slot entirely closing, one edge of the slot between said means forming a V shaped groove and the corresponding opposite edge of said slot formed with a tongue projecting into said V shaped portion, the angle formed by the edges of the groove being different from the angle formed by the edges of the tongue.

3. A fastening device comprising a formable sleeve member provided with a channel therethrough to receive and grip an article, a slot along one side of said sleeve, means at the extreme ends of said slot to prevent the slot entirely closing, one edge of the slot between said means forming a V shaped groove and the corresponding opposite edge of said slot formed with a tongue projecting into said V shaped portion, the angle formed by the edges of the groove being less than the angle formed by the edges of the tongue.

4. An article of manufacture comprising a bendable sleeve member, a longitudinal channel therethrough having a cross-section with a long and a short diameter, an open slot along one side, one edge of the slot forming a V-shaped groove having a spread equal to the length of the side, a V-shaped tongue extending from the opposite edge and projecting into the V groove, but having a spread less than the length of the side and centrally spaced thereon such that the extreme edges of the one side will coact with the extreme edges of the other side to prevent the side faces of the tongue engaging the faces of the groove, projecting means within the channel to engage the cable to interlock therewith and the thickness of the metal in the sleeve increasing uniformly from the edges of the slot to the center of the sleeve opposite the slot where the thickness is a maximum.

5. An article of manufacture comprising a formable sleeve member to receive and grip a cable, a channel therethrough, a slot along one side, one edge of said slot forming a V-shaped groove throughout its length and the opposite edge provided with a projecting V-shaped tongue of less expanse than the side from which it projects and arranged to project into the V-shaped groove, but not to engage therein and the extreme ends of the walls forming the slot arranged to engage the extreme ends of the opposite edge to prevent the tongue engaging the V-groove, the cross-section of the sleeve in a transverse plane being a minimum at the edges of the slot and a maximum at a point opposite and increasing uniformly from the maximum to the minimum.

6. A fastening device comprising a sleeve member of formable material having a longitudinal channel therethrough and an open longitudinal slot along one side of said sleeve throughout its length, the sleeve having an increasing cross-section between the edges of the slot and a point opposite the slot and adapted to be formed about and in engagement with an article in said channel and means to maintain said slot open after the said forming.

7. A fastening device comprising a sleeve member of formable material provided with a longitudinal channel therethrough and a longitudinal zig zag slot in one side of said sleeve formed by counterpart members on the adjacent edges of said slot, the thickness of metal in the sleeve being a minimum at the edges of the slot and a maximum at a point opposite the slot and means to prevent the edges of said slot meeting when the sleeve is formed about an article positioned in said channel.

In testimony whereof I affix my signature.

HOMER P. CHANDLER.